No. 869,415. PATENTED OCT. 29, 1907.
C. E. BUELL.
FIRE EXTINGUISHING APPARATUS.
APPLICATION FILED NOV. 16, 1896.
2 SHEETS—SHEET 1.
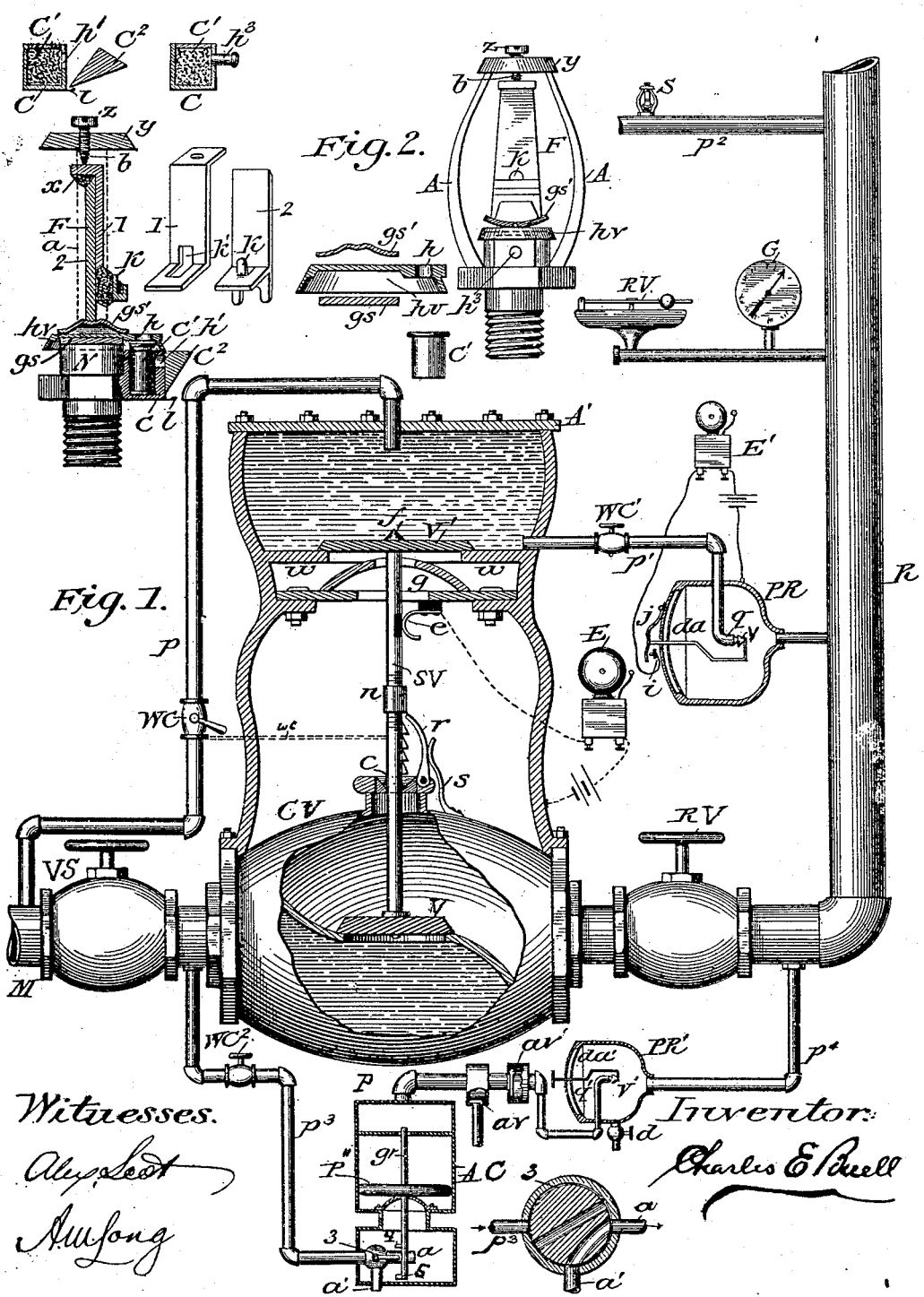

No. 869,415. PATENTED OCT. 29, 1907.
C. E. BUELL.
FIRE EXTINGUISHING APPARATUS.
APPLICATION FILED NOV. 16, 1896.
2 SHEETS—SHEET 2.
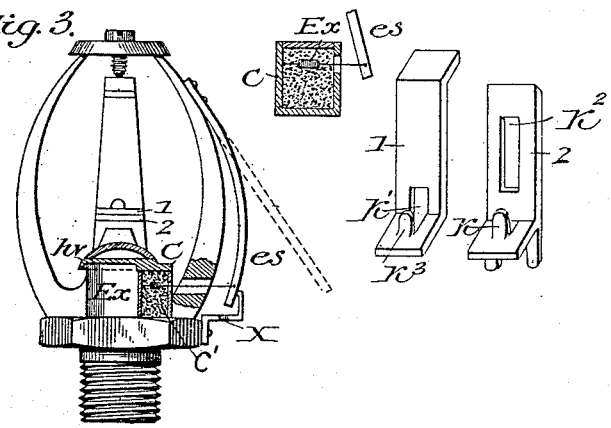
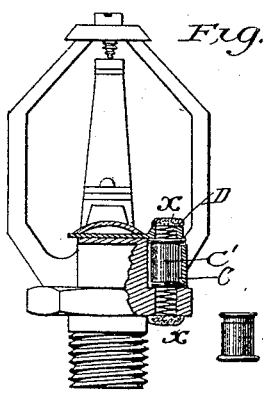
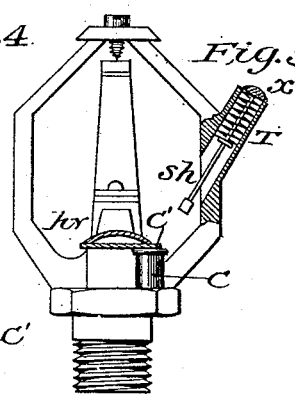
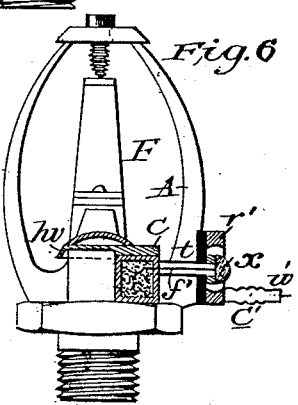
Witnesses.
Inventor.
Charles E. Buell.

UNITED STATES PATENT OFFICE.

CHARLES E. BUELL, OF NORTH PLAINFIELD, NEW JERSEY, ASSIGNOR TO GENERAL FIRE EXTINGUISHER COMPANY, OF NEW YORK, N. Y., A CORPORATION OF NEW YORK.

FIRE-EXTINGUISHING APPARATUS.

No. 869,415.   Specification of Letters Patent.   Patented Oct. 29, 1907.

Application filed November 16, 1896. Serial No. 612,347.

*To all whom it may concern:*

Be it known that I, CHARLES E. BUELL, of North Plainfield, Somerset county, State of New Jersey, have invented new and useful Improvements in Fire-Extinguishing Apparatus, of which the following is a specification.

In the accompanying drawings, Figure 1. represents a valve mechanism for normally excluding water from a system of automatic sprinklers. Fig. 2. shows an automatic sprinkler, and details, that is adapted to be used in carrying out my invention. Figs. 3, 4, 5, and 6, show modifications of the automatic sprinkler disclosed in Fig. 2.

Referring to Fig. 1. C V. is a globe valve having its valve V. held normally to its seat by water pressure upon a valve V'. which is seated upon a partition, or web, of the case a valve stem S V. connecting between the valves V. and V'.

There is shown a guide $g$ for directing the movement of the stem S V. in connection with case A'. and the stem S V. is adjustable at the nut $n$. and is provided with a rack and a ratchet dog $r$. for preventing the return of valve V. after it has been raised from its seat. The valve stem is adapted to be packed water and air tight where it enters the valve case of globe valve C V. by filling the cavity $c$. with melted paraffin after the valve has been properly seated, as shown in the drawing. Electrical insulation is shown on the valve stem at the point of contact $e$. and the contact $e$. is made a part of an alarm circuit that includes the gong E.; the circuit of which will be closed when the said valve V. is lifted, and the contact $e$. comes against the stem S V. A spring $s$. is shown for causing proper action of dog $r$, in interlocking with the teeth of the rack upon the stem S V.

The casing A'. is shown secured to the globe valve C V. and the connections, that have been described, exposed and easily accessible; but it is contemplated to cover the parts that are exposed by a suitable metal cylinder, or like simple covering.

The casing A'. is shown filled with entrapped water for holding valve V'. seated upon the webs $w.\ w.$, the water having entered through pipe $p$. which connects from the interior of casing A. to the supply main M. at a point on said main that is between the valve V S. and the source of water supply. There is also shown the eduction pipe $p'$. connecting the casing A'. to the main riser R. of a sprinkler system, and which includes the pressure regulator P R. and the way cock W C.

By means of the pressure regulator P R. a light air pressure in riser R. and the system, will hold the vent of the casing A'. through the pipe $p'$. against a considerable water pressure in the casing A'.

The pressure regulator P R. consists of a metal case into which pipe $p'$. enters; the inlet from pipe $p'$. is held normally closed by the valve $v$. which is secured to and moves and is carried by the diaphragm $da.$, so that when there is an air pressure acting against diaphragm $da.$ it is forced outward, and causes the valve $v$. to be pressed over the inlet $q$. which prevents water from entering the casing P. R. When, however, the air pressure in riser R. and the system is destroyed by the opening of sprinkler S. the water in case A'. forces back the valve $v$. and the entrapped water in casing A'. is vented; the valve V'. is relieved of its restraining pressure and the valve V. is raised by water from main M. and water enters the sprinkler system.

There is shown a projection from the support of valve $v$. normally holding the electric contact $j$. out of contact with the terminal $i$. of the circuit of gong E'.; the forward movement of the diaphragm $da$. causing the strip $j$. to close the circuit of gong E'. and sound an alarm for indicating that a sprinkler has opened.

The pipes $p$. and $p'$. are each provided with a way cock W C. and W C'., respectively, for controlling the flow of water in and through the said pipes. An arm $wc$ secured to the stem S V.—and projecting through a slot in casing A',—can be used to automatically close way cock W C. when the valve V. is lifted. There is also shown a point $f$. of rubber, on valve V'. for closing the inlet of pipe $p.$, in casing A., when the valve V'. is lifted.

As the casing A'. is quickly emptied when the valve V'. is lifted off of the partition, or webs, $w.\ w.$ the water entrapped in casing A'. is suddenly discharged through the opening in partition $w.\ w.$ when a vent has been opened from said casing, and there is no liability of the valve V'. being reseated by water pressure in the casing A., as water cannot "column" with so large an outlet as is provided through the partition at $w.\ w.$ The advantage of suddenly discharging the entrapped water through the partition $w.\ w.$ into the space containing the valve mechanism, so as to quickly release the valve V. when a sprinkler opens, is of practical consequence, and is not done by those valve mechanisms heretofore used.

The ratchet upon stem S V. acts to further prevent any downward motion of valves V. V'. when they have once been lifted.

To re-set valves V. V'. the water is excluded from the system by turning the valve V S. closed and dripping the pipes of the system by opening cock $d$. After a new sprinkler has been put in place of the one that opened valve R V. is turned closed, air forced into the riser R. and system until the desired pressure is reached, closing vent $q$. in pressure regulator P R.; then valves V. V'. are seated and water let into casing A. through pipe $p$. firmly seating valve V. after which the large valves V S. and R V. are turned to open a waterway between main M. and riser R.

By the construction and arrangement of the above described valve mechanism the main M. and riser R. can be closed by turning valves V S. and R V. and the valve mechanism tested without discharging the air that is under pressure in the system, or admitting water to the system; after which the said valves can be turned open, an advantage not present in such valve mechanism heretofore made.

The system thus described, is shown as provided with an air compressing apparatus which comprises an automatically operated pump P. having connection to main M. through pipe $p^3$., and to riser R. through pipe $p^4$. The pump P. has a piston P″. that is lifted by the water entering into the cylinder A. C. at the inlet $a$. of the three way cock 3., the piston carries a guiding stem $gr$. that is provided with points 4. and 5. that alternately turn the cock 3. so that water will enter into the cylinder A C. and then, thereafter, open the outlet $a'$. so that the water that had entered cylinder A C. will pour out through $a$. and $a'$. allowing the piston P″. to drop into the position shown, when the cock 3. will be again turned so as to close outlet $a'$. and open inlet $a$. again forcing piston P″ upwards.

As the piston P″. falls air is admitted at valve $av$. and the upward movement of piston P″. forces the air thus admitted through valve $av'$., pressure regulator P R′. into riser R. The accumulated air in riser R. is regulated to a predetermined degree by the pressure regulator P R′.—the air acting to force back and outward, the diaphragm $da'$. causing valve $v'$. to close inlet $q'$. by a slight air pressure in riser R. against a considerable pressure in the pump P. By this means the pump is brought to rest when a proper pressure has been let into pipe R. and the system; but the pump will again move when the pressure in the riser R. and system falls below the normal. The valve WC² is for controlling the flow of water from the main M to the compressor apparatus.

It occurs that in large systems the pressure increases in the pipes when the apartments are heated, and falls when the pipes become cool again. To provide for a uniform pressure in the pipes of a sprinkler system there is shown a relief valve R V. with indicator G. which, acting with the automatic air compressor, gives a uniform pressure in the pipes.

In Fig. 2. there is shown a sprinkler having a body that is provided with a screw threaded portion for connecting it to a water pipe, arms A. A. supporting a spreader $y$. A valve $hv$. covers the outlet, or nozzle, N. and also extends over a chamber C. formed in the sprinkler body which chamber contains an explosive cartridge, C′. This valve is of metal and is faced with a suitable gasket $gs$. and paraffin is poured melted into the dish shaped valve, covering the valve joint for excluding vapors, and preventing corrosion and adhesion. A strut consisting of the members 1. and 2. soldered along their contacting surfaces, and provided with a projection $k$. struck up in the deflected portion of one member so as not to bifurcate the deflected portion, registers with a slot in the other member, and solder is applied to secure the parts at this junction, and at the point $x$.—this strut holds the valve $hv$. to its seat by means of the screw $z$ running in the spreader $y$.

The valve $hv$. has a hole $h$ in it over the cartridge C′. for receiving a substance that is easily ignited. There is also a hole $h'$. through the side of the chamber C. the last mentioned hole being filled with an easily ignited compound and closed by the weight C², which is soldered on the chamber C. and adapted to drop away and open the hole to admit air to the easily ignited substance in hole $h'$. which is not ignitible while the air is excluded. By this means the use of an easily ignited substance, or compound, as phosphor compounds, ferric hydrates, picrates, and like material which is or are adapted to generate great heat, and ignite, when exposed to the atmosphere, can be caused to act at various desired and predetermined temperatures by regulating the melting point of the solder which is used to hold the air excluded.

The cartridge C′ shown is preferably a metallic shell, of copper, having a primer of fulminate, and a charge of gunpowder and the easily ignited substance in the holes $h$. $h'$. or either of them, adapted to quickly heat the fulminate to its exploding point when it becomes ignited by exposure to the atmosphere, or becomes heated sufficiently, when exposed to the atmosphere, as will occur in the use of some substances.

The cartridge C′. is placed with its open end downwards in chamber C., and when exploded acts to lift the valve $hv$. off of its seat; being so arranged as to give a leverage upon the lifted valve that will force the removable parts away if they have not been removed by heat before the explosion of the cartridge C.

A tripping point 1. is shown on chamber C. to facilitate the dropping away of the weighted cover C². which is made top heavy for the better removal of the same from covering the hole $h'$. when it is released by heat.

In place of a weight, as C². a drop of solder, $h^3$., can be used for closing a priming tube filled with the easily ignited substance, and the solder will run down out of the way, to open the tube, when acted upon by heat.

The chamber C. can be charged with a suitable explosive to be set off by the primer in the tube $h^3$. as shown.

Where the easily ignited and heated substance is used on a cartridge having a primer of fulminate of mercury, and a charge of powder, there can be no failure of the action of the explosive, as the increase in heat will fire the fulminate if the easier primer fails, and, if the fulminate fails, a further increase in heat will set off the powder.

Beneath the strut, or fusible fastening, F. there is placed a spring $gs'$. for giving a thrust to the released strut F. and with the valve joint suitably prepared with paraffin the valve $hv$. will, in most cases become removed without the action of the explosive cartridge C′., but, as a precaution against a failure of the sprinkler to open when its services are needed, an explosive is added to the structure for exerting great pressure against the adhered valve.

Fig. 3. shows a sprinkler with a valve $hv$. covering its outlet and a cartridge that includes a friction exploder E $x$., adapted to be fired, and to fire the cartridge C′. in chamber C. by a release of spring $es$. which fires the exploder in the usual manner of firing such exploders in cannon.

The strut shown in Fig. 3. has its members 1. and 2. both provided with a projection $k$ $k^3$ and the supported member is also provided with a slot $k'$ for receiving the projection $k$. of part 2.

Fig. 4. shows a sprinkler having a double cartridge C'. in the chamber C. with a fulminate primer at either end, and a hole above and beneath the cartridge filled with an easily ignited substance in which is embedded a spring D. and a fusible cap x for holding the said springs depressed and adapted to expand when released by heat acting upon the fusible cap, thus stirring the ignitible substance and causing its more certain action.

Fig. 5. shows a sprinkler having a cartridge C'. in chamber C. and the valve hv. partly covering the cartridge C'. there is shown a spring hammer sh. in a tube T. that is held normally depressed by being soldered at x.

When the hammer sh. is released by the melting of the solder at x. it strikes the cartridge C', exploding the cartridge. which lifts the valve hv. opening the sprinkler.

Fig. 6. shows a sprinkler having a cartridge, or mass of explosive material in the chamber C. and a fuse wire f'. that is embedded in the explosive, and is insulated from the body of the sprinkler except at the inner side of the chamber C. but is provided with a wire extending through the insulating tube t. to a mass of solder x that is within the insulated metal ring r'. The solder x. when melted, will run down into contact with the metal ring before it leaves its contact with the wire of fuse f'. in the tube t. and make good electric contact between the said fuse wire and said metal ring r.

A tube connector c'. is secured to the ring r'. and holds a wire w'., which is a branch of a charged electric circuit. When connection is made between the said fuse wire and the ring r'. with a circuit joined to the connector c'. that has its return circuit over the pipe which carries the sprinklers, any one of a series of sprinklers thus provided, will, when it is subjected to heat, be included in the circuit, which is normally open but which becomes closed upon the melting of the solder x, and the fuse f'. will be instantly ignited, and the explosive in chamber C. set off; resulting in the opening the sprinkler by the explosion of the cartridge.

It is due to state that the spring es. of Fig. 3. can be connected to the firing device after the sprinkler is in place, and the soldered stop at X. which holds the said spring in its normal position, can then be screwed upon the body of the sprinkler. In Fig. 5. the cartridge C. at N'. with its primer e. is added after the sprinkler is in place for use. The ignitible primer to be inserted in the valve h v. over cartridge C. at h. (and in the same manner in Fig. 6.) as shown in Fig. 2. is designed to be inserted after the sprinkler has been placed in use, or has been received at the place where it is to be placed in use. The advantage of being able to complete the arrangement of the details of an explosive adjunct to sprinklers after the same have been shipped to their destination, is obvious.

What I claim, is:

1. A valve mechanism for controlling the waterway between a supply main and a main riser of a sprinkler system that comprises a valve, a second valve inclosed in an independent casing, means for connecting said valves, entrapped water in the second valve casing for holding the said valves normally seated, and connections from said casing to a supply main and to the main riser, substantially as described.

2. A valve mechanism for controlling the waterway between the supply main and main riser of a sprinkler system that comprises a valve inclosed in a suitable case, a second valve inclosed in an independent casing, a valve stem connecting the said valves together, entrapped water in the last named casing for holding the said valves normally seated, means for adjusting the length of said valve stem, independent means for preventing the reseating of said valves, and pipe connections from the second valve casing to the supply main at a point between the water supply and the main valve for controlling the water supply to the system, and connections from said casing to the main riser, substantially as described.

3. A valve mechanism comprising a supply valve S V and a valve R V in the main riser, and having a globe valve for closing the waterway between the supply main and the main riser that is normally held to its seat by a valve of larger area which is incased separately, entrapped water for holding the last named valve to its seat, a valve stem connecting said valves, means for preventing the return of said valves to their seats when they have been raised, connections from said valve mechanism to an alarm apparatus, and connections from the said supply main and riser to a water actuated air compressing apparatus, substantially as described.

4. An automatic sprinkler having its valve normally held to its seat by a fusible fastening, an explosive charge located at one side of the outlet for generating pressure on the movable parts of the device, a valve covering the outlet and the said charge and a fusible member adapted to make operative a primer for igniting the said explosive charge by the action of heat at a predetermined temperature, substantially as described.

5. An automatic sprinkler having its valve normally held to its seat by a fusible fastening, a charge of explosive at one side of the sprinkler outlet and a primer for the said explosive charge that comprises an electric fuse-wire and a thermally operated connector, substantially as described.

6. An automatic sprinkler having a valve held to its seat by a fusible fastening and an explosive material located at one side of the sprinkler outlet and adapted to exert a pressure upon said valve when acted upon by heat, substantially as described.

7. An automatic sprinkler having a valve held to close its outlet by a fusible fastening, an explosive material in a chamber at one side of the outlet that is adapted to exert a pressure against the movable parts of the sprinkler when said explosive is ignited, and mechanism adapted to be made operative by heat for igniting said explosive at a predetermined temperature, substantially as described.

8. An automatic sprinkler having its outlet closed by a valve that is held to its seat by a fusible fastening and an explosive material in a chamber at one side of the outlet that is adapted to exert pressure upon the movable parts of the sprinkler when it is ignited, and mechanism adapted to be operated at a predetermined heat by the releasing of a fusible device to ignite said explosive, substantially as described.

9. An automatic sprinkler having an inverted dish-shaped valve extending beyond the valve seat, a gasket facing for said valve, an easily fusible material filling the space around the valve seat, an explosive charge in a chamber at one side of the outlet, and a fusible fastening for holding said valve to its seat, substantially as described.

10. An automatic sprinkler having its valve held to its seat by an easily fusible fastening, an explosive charge at one side of the outlet under the valve, and a primer for said charge of more easily ignited material, substantially as described.

CHARLES E. BUELL.

Witnesses:
A. C. BUELL,
WM. C. BUELL.